US012705264B2

(12) United States Patent
Liu

(10) Patent No.: US 12,705,264 B2
(45) **Date of Patent: *Aug. 11, 2026**

(54) SEARCH SYSTEM FOR PROVIDING SEARCH RESULTS USING QUERY UNDERSTANDING AND SEMANTIC BINARY SIGNATURES

(71) Applicant: eBay Inc., San Jose, CA (US)

(72) Inventor: Mingkuan Liu, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,399

(22) Filed: Jun. 1, 2023

(65) Prior Publication Data

US 2023/0306047 A1 Sep. 28, 2023

Related U.S. Application Data

(63) Continuation of application No. 16/133,144, filed on Sep. 17, 2018, now Pat. No. 11,698,921.

(51) Int. Cl.
*G06F 16/31* (2019.01)
*G06F 16/2453* (2019.01)
(Continued)

(52) U.S. Cl.
CPC ...... *G06F 16/325* (2019.01); *G06F 16/24532* (2019.01); *G06F 16/36* (2019.01);
(Continued)

(58) Field of Classification Search
CPC .. G06F 16/325; G06F 16/36; G06F 16/24532; G06F 16/951; G06F 18/22; G06F 18/214; G06F 18/213; G06N 3/04
See application file for complete search history.

(56) References Cited

U.S. PATENT DOCUMENTS 6,006,221 A 12/1999 Liddy et al.
6,321,189 B1 11/2001 Masuichi et al.
(Continued)

FOREIGN PATENT DOCUMENTS

CN 101251841 A 8/2008
CN 101281520 A 10/2008
(Continued)

OTHER PUBLICATIONS

Liu,"CatReco based on sequence semantic embedding and active learning", eBay Wiki, Accessed on Nov. 23, 2015, 4 pages.
(Continued)

*Primary Examiner* — Tony Wu
(74) *Attorney, Agent, or Firm* — Shook, Hardy & Bacon L.L.P.

(57) ABSTRACT

Technology for the improved processing of search queries is provided. In one embodiment, methods may return semantically relevant search results for a search query. During a pre-computing offline processing, an inventory semantic index may be generated and may include inventory binary hashing signatures that are associated with inventory listings, such as goods or services for sell, and the index may be partitioned by categories and shards. When a search query is received, relevant categories are determined using a relevant category recognition service, and a search query binary hashing signature maybe generated for the search query. The relevant categories are searched to determine hamming distances between the inventory binary hashing signatures and the search query binary hashing signature, where the hamming distance indicates semantic relevance.

20 Claims, 8 Drawing Sheets

(51) Int. Cl.

| | |
|---|---|
| ***G06F 16/36*** | (2019.01) |
| ***G06F 16/951*** | (2019.01) |
| ***G06F 18/213*** | (2023.01) |
| ***G06F 18/214*** | (2023.01) |
| ***G06F 18/22*** | (2023.01) |
| ***G06N 3/04*** | (2023.01) |

(52) U.S. Cl.

CPC .......... *G06F 16/951* (2019.01); *G06F 18/213* (2023.01); *G06F 18/214* (2023.01); *G06F 18/22* (2023.01); *G06N 3/04* (2013.01)

(56) References Cited

U.S. PATENT DOCUMENTS

| | | | |
|---|---|---|---|
| 6,523,026 | B1 | 2/2003 | Gillis |
| 8,266,150 | B1 | 9/2012 | Lin et al. |
| 8,473,532 | B1 | 6/2013 | Ben |
| 8,774,509 | B1 | 7/2014 | Yagnik et al. |
| 8,885,984 | B1 | 11/2014 | Lavi et al. |
| 9,141,882 | B1 | 9/2015 | Cao et al. |
| 9,224,386 | B1 | 12/2015 | Weber |
| 9,665,628 | B1 | 5/2017 | Dubey et al. |
| 9,684,653 | B1 | 6/2017 | Bhagat |
| 10,262,048 | B1 | 4/2019 | Cappiello |
| 10,268,752 | B2 | 4/2019 | Liu et al. |
| 10,296,380 | B1 * | 5/2019 | Garcia .................. G06F 9/4887 |
| 10,346,546 | B2 | 7/2019 | Tetreault et al. |
| 10,437,996 | B1 | 10/2019 | Li et al. |
| 10,599,701 | B2 | 3/2020 | Liu |
| 10,635,727 | B2 | 4/2020 | Liu et al. |
| 10,740,573 | B2 | 8/2020 | Tetreault et al. |
| 11,227,004 | B2 | 1/2022 | Liu |
| 11,698,921 | B2 | 7/2023 | Liu |
| 2004/0167897 | A1 * | 8/2004 | Kuhlmann .......... G06F 16/2465 |
| 2005/0033616 | A1 * | 2/2005 | Vavul ..................... G06Q 10/02 705/5 |
| 2005/0216516 | A1 | 9/2005 | Calistri-yeh et al. |
| 2006/0122872 | A1 | 6/2006 | Stevens et al. |
| 2007/0294223 | A1 | 12/2007 | Gabrilovich et al. |
| 2008/0243777 | A1 | 10/2008 | Stewart et al. |
| 2009/0016600 | A1 * | 1/2009 | Eaton ..................... G06V 20/47 382/103 |
| 2009/0024623 | A1 | 1/2009 | Broder et al. |
| 2009/0138454 | A1 | 5/2009 | Rayner et al. |
| 2009/0210368 | A1 | 8/2009 | Deo et al. |
| 2010/0010973 | A1 | 1/2010 | Harrington |
| 2010/0198841 | A1 | 8/2010 | Parker et al. |
| 2010/0228733 | A1 | 9/2010 | Harrison et al. |
| 2011/0029525 | A1 | 2/2011 | Knight |
| 2011/0085739 | A1 | 4/2011 | Zhang et al. |
| 2011/0213802 | A1 | 9/2011 | Singh et al. |
| 2011/0229031 | A1 | 9/2011 | Ranganathan |
| 2012/0131139 | A1 | 5/2012 | Siripurapu et al. |
| 2013/0013601 | A1 | 1/2013 | Kabiljo et al. |
| 2013/0013603 | A1 | 1/2013 | Parker et al. |
| 2013/0091138 | A1 | 4/2013 | Liensberger et al. |
| 2013/0318014 | A1 | 11/2013 | Ismalon |
| 2014/0156567 | A1 | 6/2014 | Scholtes |
| 2015/0082156 | A1 | 3/2015 | Rollins et al. |
| 2015/0100527 | A1 | 4/2015 | Ryan |
| 2015/0142807 | A1 | 5/2015 | Hofmann et al. |
| 2015/0186495 | A1 | 7/2015 | Abbas et al. |
| 2015/0199339 | A1 | 7/2015 | Mirkin et al. |
| 2015/0278254 | A1 | 10/2015 | Bhardwaj et al. |
| 2015/0310497 | A1 | 10/2015 | Valin et al. |
| 2015/0331929 | A1 | 11/2015 | El-saban et al. |
| 2015/0339756 | A1 | 11/2015 | Konik et al. |
| 2015/0363688 | A1 | 12/2015 | Gao et al. |
| 2016/0012124 | A1 | 1/2016 | Ruvini et al. |
| 2016/0042296 | A1 | 2/2016 | Shan et al. |
| 2016/0063122 | A1 | 3/2016 | Asur et al. |
| 2016/0078057 | A1 | 3/2016 | De |
| 2016/0078507 | A1 | 3/2016 | Shivaswamy et al. |
| 2016/0155069 | A1 | 6/2016 | Hoover et al. |
| 2016/0179933 | A1 | 6/2016 | Dimassimo et al. |
| 2016/0179945 | A1 | 6/2016 | Lastra Diaz et al. |
| 2016/0196340 | A1 | 7/2016 | Cheslow |
| 2016/0224893 | A1 | 8/2016 | Parker, Jr. et al. |
| 2016/0225053 | A1 | 8/2016 | Romley et al. |
| 2016/0232238 | A1 | 8/2016 | Sweeney et al. |
| 2017/0083602 | A1 | 3/2017 | Liu |
| 2017/0091240 | A1 | 3/2017 | Yu et al. |
| 2017/0124618 | A1 | 5/2017 | Roeseler et al. |
| 2017/0177712 | A1 | 6/2017 | Kopru et al. |
| 2017/0235824 | A1 | 8/2017 | Liu |
| 2017/0372398 | A1 | 12/2017 | Kopru et al. |
| 2018/0032611 | A1 | 2/2018 | Cameron et al. |
| 2018/0052908 | A1 | 2/2018 | Liu et al. |
| 2018/0052928 | A1 | 2/2018 | Liu et al. |
| 2018/0107685 | A1 | 4/2018 | Kale et al. |
| 2018/0107902 | A1 | 4/2018 | Yang et al. |
| 2018/0108066 | A1 | 4/2018 | Kale et al. |
| 2018/0114144 | A1 | 4/2018 | Miranda et al. |
| 2018/0157681 | A1 * | 6/2018 | Yang ................ G06F 18/24147 |
| 2018/0276495 | A1 | 9/2018 | Yu et al. |
| 2019/0037257 | A1 | 1/2019 | Nelson et al. |
| 2019/0179891 | A1 | 6/2019 | Rangarajan |
| 2019/0362021 | A1 | 11/2019 | Balduino et al. |
| 2020/0073968 | A1 | 3/2020 | Zhang et al. |
| 2020/0089808 | A1 | 3/2020 | Liu |
| 2020/0218750 | A1 | 7/2020 | Liu |
| 2021/0056266 | A1 | 2/2021 | Ma et al. |

FOREIGN PATENT DOCUMENTS

| | | | |
|---|---|---|---|
| CN | 102057371 | A | 5/2011 |
| CN | 102156686 | A | 8/2011 |
| CN | 102402561 | A | 4/2012 |
| CN | 102439590 | A | 5/2012 |
| CN | 108431809 | A | 8/2018 |
| CN | 108701118 | A | 10/2018 |
| JP | 2015-5027 | A | 1/2015 |
| WO | 2017/112482 | A1 | 6/2017 |
| WO | 2017/112650 | A1 | 6/2017 |
| WO | 2017/139575 | A1 | 8/2017 |
| WO | 2018/035139 | A1 | 2/2018 |

OTHER PUBLICATIONS

Bahdanau et al., "Neural Machine Translation by Jointly Learning to Align and Translate", Published as a conference paper at ICLR 2015, 2015, pp. 1-15.

Burch,"How to Calculate Hamming Distance", Retrieved from the Internet URL: <https://sciencing.com/how-to-calculate-hamming-distance-12751770.html>, Jun. 20, 2018, pp. 1-2.

Cho et al., "Learning Phrase Representations using RNN EncoderDecoder for Statistical Machine Translation", arXiv:1406.1078, Sep. 3, 2014, 15 pages.

Douze et al., "Polysemous Codes", Retrieved from the Internet URL: <https://arxiv.org/pdf/1609.01882.pdf>, Oct. 10, 2016, pp. 1-18.

Gao et al., "Learning Continuous Phrase Representations for Translation Modeling", Microsoft Research, 2014, pp. 699-709.

Juarfsky,"Language Modelling", Accessed Jun. 18, 2021 from <https://web.archive.org/web/20160508024626/https://web.stanford .edu/class/cs 124/lec/languagemodeling .pdf>, 2016, 88 Pages.

Kait,"New in iOS 8 : A Faster Way to Save With Pocket 5.6", Retrieved from the Internet URL: <https://getpocket.com/blog/2014/09/coming-soon-in-ios-8-a-faster-way-to-save-with-pocket-5-6/>, Sep. 15, 2014, 3 pages.

Lin et al., "Deep Learning of Binary Hash Codes for Fast Image Retrieval", Retrieved from the Internet URL: <http://www.iis.sinica.edu.tw/~kevinlin311.tw/cvprw15.pdf>, 2015, pp. 1-9.

Mino et al., "Learning Bilingual Phrase Representations with Recurrent Neural Networks", In Proceedings of MT Summit XV, vol. 1, Miami, Florida, USA, Oct. 30-Nov. 3, 2015, pp. 44-55.

Selby,"Standard Mathematical Tables", Nineteenth Edition Published 1971 by The Chemical Rubber Co., 1971.

(56) References Cited

OTHER PUBLICATIONS

Sutskever et al., "Sequence to Sequence Learning with Neural Networks", arXiv: 1409.3215, Dec. 14, 2014, pp. 1-9.
Xia et al., "Research on Personalized Recommendation System for e-commerce based on Web Log Mining and User Browsing Behaviors", published in 2010 International Conference on Computer Application and System Modeling (ICCASM 2010) (Year: 2010), 2010, 4 Pages.

* cited by examiner

400

| INVENTORY ID NUMBER | INVENTORY TITLE | INVENTORY BINARY HASHING SIGNATURE |
| --- | --- | --- |
| 273042014134 | MEN'S SWEATER ABSOLUT JOY VI-M1307 | 0100110111010011010011000100101101101010100101010 |
| 273023503776 | Champion Reverse Weave Track Pants (Grey | 1010010101010101001001101010101010101101011010101 |
| 162869955640 | juicy trendz mens gloves | 1010000111010011101000101001100010101110101011011 |
| 322865458826 | NWT Nike Train Speed 4 AMP KENTUCKY W | 0100110111010011010011000100101101101010100101010 |
| 251603690513 | Red England Adjustable Baseball Cap (AC20 | 0001110011001101000110101010110010101001010010101 |
| 252671178283 | Thailand Sabaii Sash Used in Traditional Tha | 1010000111010011101000101001100010101110101011011 |
| 122816891481 | Cofra V481-0-05.Z58 "Leiria" Trousers Black/ | 0100110111010011010011000100101101101010100101010 |
| 173055383380 | UNITS 1 TO 21 EMBROIDERED REGIMENT | 1110110001001010110101100011010101101100011001010 |
| 272924459047 | Rugby Division Franz Graphic Rugby Pants B | 1010000111010011101000101001100010101110101011011 |
| 252970394247 | Swix Warm Tights - Men's | 0100110111010011010011000100101101101010100101010 |
| 263431018565 | Indian Kurta Pajama Mens Wear Ethnic Tradi | 1010010101010101001001101010101010101101011010101 |
| 112520217840 | Alexandra STC-NM30SN-32A Essential Mens | 1010000111010011101000101001100010101110101011011 |
| 142540931509 | Sojanya Classic Solid Dupion Silk Kurta Chur | 0100110111010011010011000100101101101010100101010 |
| 201940693001 | Mens Tailored Shirt – Perfect Fit Guarantee w | 0001110011001101000110101010110010101001010010101 |
| 273017762726 | MEN'S POLE BIKKEMBERGS BO-C_8_81B_ | 1010000111010011101000101001100010101110101011011 |
| 192424808567 | 4XL TALL Mens Scandia Woods Denim Zippe | 0100110111010011010011000100101101101010100101010 |
| 302496028267 | DELLA CIANA men's sweater light beige 100 | 1110110001001010110101100011010101101100011001010 |
| 122647980548 | Elsayx Men's Sheer Tights with Sheath | 1010000111010011101000101001100010101110101011011 |
| 292295632813 | T-SHIRT LONG SLEEVE Men 40WEFT TEO | 0100110111010011010011000100101101101010100101010 |
| 332450078136 | Men Sweater 0-Neck Long Sleeve Patchwork | 0001110011001101000110101010110010101001010010101 |

SEARCH SYSTEM FOR PROVIDING SEARCH RESULTS USING QUERY UNDERSTANDING AND SEMANTIC BINARY SIGNATURES

CROSS-REFERENCE TO RELATED APPLICATIONS

This application is a continuation of U.S. patent application Ser. No. 16/133,144, filed on Sep. 17, 2018, the entire contents are incorporated herein in their entirety.

BACKGROUND

Search systems are used to return search results of electronically stored information. Some search systems utilize keyword-based searching to find and retrieve matching electronic information. However, conventional search systems, such as those based on keyword matching, do not always return the best search results when the search query does not precisely match any stored electronic information. Additionally, keyword-based search systems tend to be slow and use large amounts of processing power to compare search terms to all candidate matches. Keyword-based search systems and other conventional search systems generally have no method of compensating for search terms that return only a few search results, or no search results at all, and they have no way to efficiently determine semantically related results without expending large amounts of processing power and time.

SUMMARY

Embodiments of the present invention relate to methods, systems, and computer storage media for providing semantically meaningful search results for search queries in an online computing environment. By way of background, conventional methods, such as keyword-based search methods and methods using floating point vectors, for retrieving search results do not always return the most relevant results. Many of these methods are also problematic to implement because of the time and processing power needed to semantically compare the search query with candidate search results, e.g., inventory listings. Thus, a tradeoff exists between the required processing power and the relevancy of search results. This problem is compounded by the ever-increasing number of stored inventory listings that might be relevant to a search results. As such an alternative method for storage and retrieval of inventory listings that reduce the computational demand when determining search results would improve computing operations and hardware for systems performing the method.

Embodiments described in the present disclosure are directed toward improving search systems based on the data structure of stored information by an inventory semantic index that is partitioned by categories and shards, and includes binary hashing signatures for stored inventory listings. Embodiments described are further directed to improving search systems by improving the retrieval of information from the index by generating and processing semantic binary hashing signatures for search queries and a plurality of inventory listings. In particular, in an example embodiment, a storage structure that facilitates and enables the search and retrieval of inventory listings using less computationally demanding methods is provided. An inventory semantic index may be generated and may comprise the binary hashing signatures for the inventory listings. The inventory semantic index may be partitioned by categories and shards, where the shards further partition inventory listings within a category. By partitioning the inventory semantic index by categories and shards, parallel searching of inventory listings may be performed, which reduces the amount of time needed to identify relevant inventory listings. Even further, this index data storage structure allows a subset of inventory listings to be selected from the entire corpus of the inventory listings in the index based on the relevancy of the categories. That is, only the item listings in categories that are determined to be relevant are searched. This greatly reduces the number of hamming distances determined by the processor. Those inventory listings associated with the shortest hamming distances from each of the relevant categories may be retrieved and ranked as a group before being communicated as search results.

In additional embodiments described herein, a search query binary hashing signature is compared to inventory binary hashing signatures for a plurality of inventory listings stored in a database. Comparing the binary hashing signatures is based on computing hamming distances between the search query binary hashing signature and the binary hashing signature of each of a plurality inventory listings. Computing the hamming distance between the binary hashing signature of the search query and the binary hashing signature of the inventory listing is much less computationally demanding and requires less processing time as opposed to determining vector distances between conventional floating point vector methods. Also, computing the hamming distance between binary hashing signatures greatly increases the chance of identifying semantically relevant inventory listings over keyword-based searches.

By way of example, a search query, for an inventory listing in a product listing inventory is received. The search query is processed to generate a binary hashing signature based on a semantic vector representation of the search query in a vector space. The inventory listings in the product listing inventory, using an offline process, are each associated with a category and a binary hashing signature in an inventory sematic index. Upon receiving the search query, a relevant category is determined for the search query. Only the binary hashing signatures of inventory listings within the determined relevant category are compared to the search query binary hashing signature. Comparing the search query binary hashing signature is based on computing a hamming distance. Inventory listings having the closest binary hashing signatures, as determined by the hamming distance, within each relevant category searched may be received. The received inventory listings may be ranked based on their associated hamming distances and other factors. The ranked inventory listings may be communicated as search results.

In operation, a method may include a semantic-signature generator that has a machine-learning model and a semantic signature service for employing the model. The semantic-signature-generator service, using the semantic signature model, generates semantic signature representations, such as a binary hashing signature, for an input. The input may include a search query or inventory identifier associated with an inventory listing, such as a good or service for sale. The inventory listing may be associated with a category. The offline process may include generating an inventory semantic index having the binary hashing signatures for a plurality of inventory listings, and the inventory semantic index may be partitioned by category.

During a runtime process, a search query may be received from a client computing device. A binary hashing signature for the search query may be generated using the semanticsignature-generator model. A relevant category recognition service may be employed to identify a relevant category within the inventory semantic index based on the search query. In some cases, only the identified relevant categories of the inventory semantic index are searched. To search within the relevant categories, a distance, such as a hamming distance, may be determined by comparing the search query binary hashing signature and the inventory binary hashing signatures for the relevant categories. Based on the hamming distance, inventory listings may be retrieved and returned as search results to the client computing device.

As such, the embodiments described herein improve computing functions for performing searches in a search system. In particular, the improvement to computing function based on processing binary hashing signatures for search queries and inventory listings, results in computing efficiency in search queries. Additional objects, advantages, and novel features of the technology will be set forth in part in the description which follows, and in part will become apparent to those skilled in the art upon examination of the following or learned by practice of the technology.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 4 is an example inventory semantic index, in accordance with an embodiment described herein;

DETAILED DESCRIPTION

Figure 1:
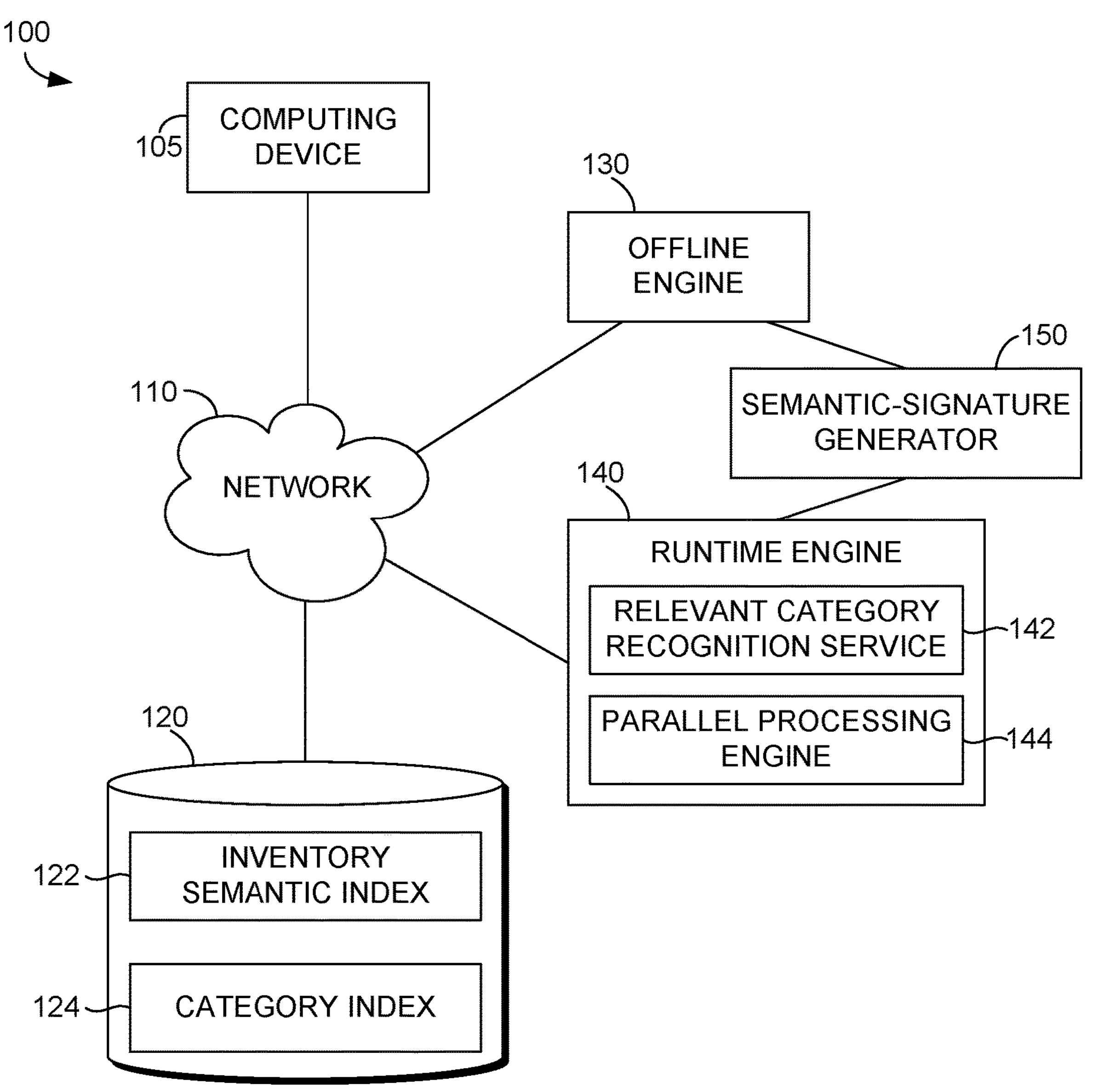
FIG. 1 is an example search system for returning search results, in accordance with an embodiment described herein.

Search systems support identifying, for received search queries, search query result items from item databases. Item databases can specifically be for content platforms or item listing platforms such as EBAY content platform, developed by EBAY INC., of San Jose, California. A search query, having one or more keywords, can be executed using a search system to find relevant search results based on the one or more keywords of the search query.

In conventional search systems, many times search returns do not include the most relevant or the most desired search results. Some search returns include no results or only a few results. These low or null search returns occur because many conventional search systems do not take into account semantic relativity between a search request and candidate matches, e.g, stored inventory listings. One of the primary problems with determining search results based on semantic relativity is the time and processing power needed to compare the search query to the inventory listings. As such, conventional search systems have evolved in ways that do not return many semantically related search results. One example of conventional methods that fail to return many semantically related search results is a keyword-based search system.

Search systems based on keyword matching do not always return the best search results when the search query cannot be matched to enough or any stored electronic information. Additionally, keyword-based search systems tend to be slow and use large amounts of processing power to compare search terms to all candidate matches. Keyword-based search systems and other conventional search systems generally have no method of compensating for search terms that return only a few search results, or no search results at all.

The technology provided by the disclosure not only improves search technology in a computing environment, but it also improves computing hardware and the function of the computer during the process of identifying and returning semantically meaningful search results. For example, a processor, such as the example processor later described with FIG. 8, generally has a finite amount of processing power. By reducing the processing power demanded on the processor, the remaining processing power is freed up to be used for other computational activities. Thus, a computer employing the processor is made more efficient by more effective use of its processing power.

The described technology reduces the processing demand of the computer processor, and thereby makes the computer more efficient. As an example, comparing binary hashing signatures reduces computational demand on the processor as compared to conventional technologies in this field, such as keyword based searching. Further, some methods employ the use of a relevant category recognition service to determine one or more relevant categories for searching inventory listings. In some of these cases, not all categories are searched; rather, the relevant categories are searched for inventory listings. Only the relevant categories may searched, and the categories not identified as relevant are not searched. This method reduces the number of comparisons between binary hashing signatures of the search query and the inventory identifiers. This reduces the amount of processing demand on the processor, and decreases the amount of time that is required to return search results when compared to conventional methods in the field.

In another example, computer performance during the search is improved based on the manner by which the inventory semantic index is partitioned, i.e., the data structure of the index itself. As noted, the inventory semantic index may include many binary inventory representations, such as the inventory binary hashing signatures, and may be partitioned by categories and shards. This not only allows for parallel searching, but also allows for parallel searching of only certain portions of the index at the exclusion of other portions, thus reducing the amount of time and processing power required to search through the index and return results. In such cases where binary hashing signatures are used, the nature of the binary hashing signature allows for rapid comparison between two binary hashing signature representations. Thus, the data structure of the inventory semantic index improves the computer's ability to access and retrieve search results in a faster more efficient manner and utilize less processing power to do so.

The described technology also includes methods that are not routinely performed in the field of this technology. It is not a routine or well-understood activity in this technological field to search for inventory listings based on relevant categories. Additionally, it is not well-understood, routine, or conventional in the field to store the inventory binary hashing signatures in an inventory semantic index that is partitioned by categories and shards.

Additionally, the described technology improves search systems and retrieval of electronically stored data. As previously noted, conventional methods do not always return the most relevant search results, especially when search terms are not entered as intended, such as a misspelled word or a low-resolution image. In such cases, these conventional systems may not return search results at all. Semantic comparison based on binary hashing signatures, however, may identify inventory listings as search results that would not otherwise be identified by these conventional systems because the search results are semantically relevant to the search query, even if they do not match it precisely of have a common key word. Thus, the quality and quantity of search results using these methods is improved.

Embodiments of the present invention are directed to simple and efficient methods, system, and computer storage media for improving search system based on generating and processing semantic binary hashing signatures for search queries and a plurality of database items. In particular, a search query binary hashing signature is compared to semantic binary hashing signatures for a plurality of inventory listings as database items. Comparing the semantic binary hashing signatures is based on computing hamming distances between the search query binary hashing signature and binary hashing signatures of each of a plurality inventory listings. The inventory listings may be a subset of inventory listings selected from the entire corpus of inventory listings stored on a database based on one or more criteria. Search query result items are selected from the plurality of inventory listings based on a proximity between the search query binary hashing signature and binary hashing signatures of each of a plurality of inventory listings.

Embodiments described herein may be implemented specifically for searching electronic information or database items defined using binary hashing signatures. The information or database items searched may be inventory listings, such as a listing of a product or service for sale in an electronic environment, such as the Internet. The inventory listing may include inventory identifiers, which generally identify or describe the inventory listing. For example, some inventory identifiers might include titles, international standard book numbers (ISNBs) or other universal or standard numerical representations, names, descriptions, pricing information, customer reviews, seller information, shipping information, item condition, item features, service descriptions, licensing agreements, or any other information that could be used to identify the inventory listing. Inventory identifiers may be conveyed using text-based information, but they are not limited to text and could include pictorial; audio; video; encoded information, such as a barcode; or other manners of conveying information electronically or to a person.

Inventory listings may be associated with a category. An inventory listing may be associated with a category based on the inventory identifiers. An inventory listing may be assigned a category by, for example, a seller or an online marketplace. Categories may also include subcategories to even further identify and sort subgroups of inventory listings. For example, a category for an online marketplace may include "Sporting Goods." A subcategory of Sporting Goods may be "Outdoor Sports," which may include another subcategory of "Backyard Games," and so forth. Thus, an inventory listing for a "Croquet Set" may be included in each of these categories. Inventory listings are not necessarily limited to one category or its subcategories; rather some inventory listings might be associated with multiple categories. One such category scheme may be leaf categories provided by the EBAY content platform, which categorizes the goods and services available an online marketplace. The leaf category may be a category that has no additional subcategories. Using the example above, the leaf category would be Backyard Games. At a given time, there may be upwards of 16,000 leaf categories that include inventory listings, which sometimes may include 10 million or more inventory listings in a single leaf category.

During a pre-computing offline process, binary hashing signatures may be generated from inventory identifiers associated with inventory listings. What is meant by a pre-computing or offline process is that the action may occur on a non-client device, and in some cases, may occur prior to receiving a search request from the client device. In some instances, a binary hashing signature may be generated from the inventory identifier using a semantic-signature generator. The semantic-signature generator may employ the use of a semantic-signature-generator model that is trained to generate binary hashing signatures of inputs, such as in inventory identifier or a search query. The semantic-signature-generator model may comprise a neural network, and the neural network may be trained from stored behavioral data of users, such as those interacting with an online marketplace. Using the behavioral data, the semantic-signature-generator model may be trained to generate binary hashing signatures that are semantically related when there is a short distance, such as a hamming distance, between two generated binary hashing signatures. As such, a search query binary hashing signature, generated from the model using a search query input, may be semantically related to an inventory binary hashing signature, generated from the model using an inventory identifier of an inventory listing as an input, when the search query and the inventory listing are semantically related based on the stored behavioral data.

The binary hashing signature generated by the semantic-signature generator may be generated from a vector representation, such as a vector representation of a search query or a vector representation of an inventory identifier of an inventory listings. Vector representations in the common vector space may comprise floating point numbers. For example, a vector representation of an inventory listing may be generated by a deep learning model that projects a sequence symbols, such as phrases, sentences, etc., into a multi-dimensional vector space, sometimes referred to as a semantic space. In the semantic space, semantic level similar sequences have closer representations. A given sequence, such as an inventory identifier, may be projected into the semantic space by representing the sequence as vectors. Machine learning of the deep learning model, for example, a deep neural network (DNN) or a convolutional neural network (CNN), may be performed using store behavioral data, such as click-through and purchase data for an online marketplace. Thus, vector representations having a close relationship will be semantically relevant based on stored behavioral data. As such, a search query may be semantically relevant to an inventory listings based on the behavioral data when the search query vector representation is close to the inventory listing vector representation.

The binary hashing signature generated by the semantic-signature generator may be any binary representation, e.g., a set of binary numbers or characters of any length. A typical example suitable for practicing the present technology may be a set of 0s and 1s. The set of binary numbers may be generated as a binary hashing signature of the vector representation, such as the search query vector representation and the inventory vector representation. Thus, a search query binary hashing signature of the search query vector representation and an inventory binary hashing signature of the inventory vector representation will have a close distance, e.g., a hamming distance, when the search query is semantically related to the inventory listings because the vector representations of the search query and the inventory listing are close. In another case, the semantic-signature generator may generate a binary hashing signature of an inventory listing directly from the inventory identifier. Put another way, the semantic-signature-generator model used by the semantic-signature generator may be trained to generate a binary hashing signature of the inventory identifier based on the behavioral data, such that binary hashing signatures indicate greater semantic similarity when the binary hashing signatures are closer. In such cases, the vector representation may not be generated from the inventory index as a preceding step to generating the binary hashing signatures.

The inventory binary hashing signature associated with the inventory listing may be stored in an inventory semantic index, which may sometimes include the vector representation of the inventory listing. Thus, the inventory semantic index may comprise a plurality of inventory binary hashing signatures, where each is associated with a stored inventory listing such that the stored inventory listing may be recalled based on identifying the inventory binary hashing signature. As the stored inventory listings may be associated with a category, the inventory semantic index may be partitioned by category. For example, the inventory semantic index may include groups of inventory listings, where each of the inventory listings in the group is associated with the same category. The category index may be partitioned by leaf categories.

Some categories of the inventory semantic index may have a large number of inventory listings associated with the category. As previously noted, some categories might include 10 million or more inventory listings. As it will be appreciated, the more inventory listings that are associated with a category, the more time it will take to search the category for relevant inventory listings. For example, it generally takes more time to search a category having 10 million inventory listings than it does to search a category having 1 million inventory listings. To reduce the search time and the processing power required to search these larger categories, some categories may be further partitioned by shards. The shards generally partition groups of inventory listings within a category into small groups or subgroups. For example, a category having 10 million inventory listings may be further partitioned by 20 shards, each shard associated with 500,000 inventory listings. More or less shards may be included to partition the category into subgroups of inventory listings of any number.

By partitioning the inventory semantic index by categories and shards, a parallel processing engine may search the index in parallel. Parallel searching of the index may include searching multiple categories and multiple shards at the same time. Continuing with the example above, the parallel processing engine may search the inventory listings for all 20 shards at the same time. Said differently, the search query binary hashing signature may be compared to the inventory binary hashing signatures for each group of 500,000 inventory listings at the same time, e.g., the 20 subgroups associated with the 20 shards are searched simultaneously. In this example, only 500,000 inventory listings of a subgroup are searched serially, which is faster than serially searching all 10 million inventory listings of the category.

Index identifiers may be included in the inventory semantic index and associated with categories and shards. An index identifier may be any form of computer recognizable code that may be embedded in the inventory semantic index. The parallel processing engine may utilized the index identifiers to search the inventory listings in parallel. Parallel searching of the inventory semantic index using the index identifiers is further described below.

The semantic-signature-generator model that generates the binary hashing signature of the search query and the binary hashing signature of the inventory listings that are stored in the inventory semantic index may be trained so that the distance between the binary hashing signatures indicates semantic relevance between the associated inventory listing and the search query. Some aspects of training the semantic-signature-generator model are described in U.S. application Ser. No. 15/439,021, entitled "Semantic Forward Search Indexing of Publication Corpus," and U.S. application Ser. No. 15/192,323, entitled "Vector Representation of Descriptions and Queries," each of which is incorporated by reference in its entirety.

As an example, the semantic-signature-generator model may be trained from behavioral data. The behavioral data may be behavioral data of users interacting with an online marketplace, such as buying, selling, or browsing. The behavioral data may comprise click-through data, purchase data, and the like. In some cases, a neural network, such as a CNN or a long-short-term memory (LSTM) neural network, may be trained using the stored behavioral data. Thus, the trained model may generate semantic binary hashing signatures in accordance with the behavioral data. For example, the model may be trained so that two generated binary hashing signatures have an increasingly closer hamming distance as the two inputs represented in binary form are increasingly semantically similar. In some cases, the model may be trained offline and used to generate the inventory binary hashing signatures for the inventory semantic index, and may be utilized by a runtime engine to generate query binary hashing signatures for search queries.

Once trained, the semantic-signature-generator model may be used to generate binary hashing signatures for a plurality of inventory identifiers associated with a plurality of inventory listings stored in one or more databases in communication with a network. For example, the semantic-signature-generator model may be trained to generate an inventory binary hashing signature for an inventory listing based on the inventory identifier.

The inventory semantic index may be used to identify search results for a search query. For example, during a runtime process, a search query is received from a client computing device. What is meant by a runtime process is a time at which a search is to be conducted for search results for a search query, and the process may take place on the client computing device, or a client computing device and another server that are in communication via a network. From the search query, the semantic-signature generator may generate a search query binary hashing signature. The search query binary hashing signature and the inventory binary hashing signature stored in the inventory semantic index may be compared to determine a hamming distance. And as noted, the shortest hamming distances may represent the greatest relative semantic similarity between the search query and the inventory listing associated with the inventory identifier.

To calculate the hamming distance, the search query binary hashing signature may be compared to the inventory binary hashing signature during a runtime process. As noted, each of the binary hashing signatures may be a set of 1s and 0s. Each set of 1s and 0s is compare to determine a number of differences between the 1s and 0s of each set. The hamming distance may represent the number of difference between set of 1s and 0s, i.e., the number of difference between the inventory binary hashing signature and the search query binary signature. The lower the hamming distance, the more semantically related the search query is to the inventory listing. Each set of binary digits, for example, the 1s and 0s, may comprise the same number of binary digits.

Relevant categories may be searched to determine semantically related inventory listings. In some cases, only the relevant categories are searched, and other categories are not searched. Determining the relevant categories reduces the scope of the search and the number of inventory listings that are compared, which decreases computational time and power. Relevant categories may include categories and subcategories, and may include leaf categories. For example, when a search query is received, relevant categories maybe determined for the search query using a relevant category recognition service. Some aspects of identifying relevant search categories may be found in U.S. application Ser. No. 15/429,564, entitled "Semantic Category Classification," which is incorporated by reference in its entirety.

As an example, a plurality of categories may include a category taxonomy, such as category labels that may aid in identifying inventory listings within the category. Continuing with the example above, a category taxonomy might include Sporting Goods, Outdoor Sports, and Backyard Games, with Backyard Games being the leaf category for this example. Each of the categories may have a corresponding category vector determined using a deep learning machine-learned model. For example, the relevant category recognition series may include a deep learning model that may be trained using stored category—inventory listing pairs for inventory listings that have been previously associated with categories. Using a corpus of category—inventory pairs, the deep learning model may be trained to generate vector representations of inputs. By training the model on previously stored category—inventory listing pairs, vector representations for semantically related pairs are close, meaning that the more semantically related the category is to the inventory listing, the shorter the vector distance will be between the corresponding vector space representations.

The relevant category recognition service, using the trained model, generates a vector representation of the category taxonomy, e.g., each of the categories available to categorize item listings, and stores the vector representations in a category index. The vector representations of the categories may be generated and stored in the category index during an offline process.

During runtime, the relevant category recognition service then uses the category index to determine relevant categories for a search query. The trained model may be used to generate a vector representation of the search query. As noted, the vector representation of the search query will have a short distance when compared to the vector representation of a category when the search query and the category are semantically related. Cosine similarity may be used to determine the vector distance between the search query vector representation and the category vector representation. Relevant categories may be determined for a search query based on the vector distance being below a threshold value. A particular number of relevant categories may be determined in addition to or in lieu of the threshold value. For example, the relevant category recognition service may identify the top five categories having shortest vector distances. It will be appreciated that any particular number of relevant categories could be used.

Once the relevant categories are identified, the relevant categories may be searched to identify inventory listings within the relevant category to return as search results. Sometimes, only the relevant categories are searched and other categories are not searched. In one case, one relevant category may be identified. In other cases, a plurality of relevant categories are identified and searched. To search these categories, the search query binary hashing signature may be compared to the inventory binary hashing signatures of inventory listings in the relevant categories of the inventory semantic index to determine a hamming distance between the binary hashing signatures.

In some aspects, the relevant categories are searched in parallel, which increases the speed at which semantically relevant inventory listings may be identified from the inventory semantic index. Parallel searching may be performed by a parallel processing engine. For example, when one relevant category is identified, the relevant category is searched by comparing the inventory binary hashing signatures stored in the inventory semantic index within the relevant category to the search query binary hashing signature. In another example of parallel searching of the categories, a plurality of relevant categories is identified. Here, each relevant category of the plurality is searched simultaneously, meaning that while the query binary hashing signature is being compared to the inventory binary hashing signatures of one relevant category, the query binary hashing signature is also being compared to the inventory binary hashing signatures of another relevant category during the same time.

Parallel searching may also be performed when relevant categories in the inventory semantic index are partitioned by shards, for example, because of a large number of inventory listings in the relevant category. Parallel processing engine may determine that an identified relevant category within the inventory semantic index contains shards that partition the relevant category into subgroups of inventory listings by identifying index identifiers or by identifying the number of inventory listings in the relevant category is above a threshold value. As an example, a relevant category may have 10 million inventory listings. Shards may be used to partition the relevant category into subgroup of 500,000 inventory listing. Thus, each shard in this example would be associated with 500,000 inventory listings, and there are 20 total shards that partition the relevant category. If the category is identified to be relevant, parallel processing engine may identify that the category has a plurality of shards, in this case, 20 shards, and process the shards in parallel. Here, the inventory listings for each of the 20 groups may be searched in parallel, meaning that the search query binary hashing signature is compared to the stored inventory binary hashing signatures for inventory listings in each group at the same time. Additionally, shards and categories may be searched in parallel in cases where a plurality of relevant categories includes a category having shards and a category that does not have shards. Here, the category without shards may be searched in parallel with the shards of the relevant category that is partitioned by shards.

As previously noted, the inventory semantic index may include index identifiers. In general, an index identifier may be a group id, representing a group of inventory listings having the same category. A category may include one index identifier because it has no shards, or the category may have multiple index identifiers if it is further partitioned by shards. The parallel processing engine may utilize the index identifiers for parallel searching of the index based on the relevant categories and shards. For example, if two relevant categories are identified, each category may be associated with an index identifier. The parallel processing engine locates each index identifier of the relevant category and begins searching each relevant category simultaneously, beginning with the index identifier. The parallel processing engine may stop searching when it reaches another index identifier, indicating that the remaining inventory listings are not associated with the relevant categories being searched.

Categories having shards may be searched in a similar manner. Parallel processing engine may identify the presence of shards in a relevant category when there are multiple index identifiers associated with a relevant category. The parallel processing engine may then search the inventory listings associated with each shard simultaneously by beginning the search at each of the inventory identifiers and searching the inventory listings until reaching another inventory identifier, which may indicate a shard of the relevant category that was searched in parallel or another category not identified as relevant. The parallel processing engine may then stop searching when it reaches the next index identifier. In this manner each of the shards of the relevant categories are searched in parallel. There may be cases where multiple categories are identified, and some relevant categories include shards, while others do not. The index identifiers may enable parallel searching of each category and shard simultaneously by the parallel processing engine in a similar manner by searching beginning at each index identifier of a relevant category, whether the category includes one index identifier because it has no shards or it has multiple index identifiers because it is further partitioned by multiple shards, and continuing to search the inventory listings until the parallel processing engine encounters another index identifier.

The search may identify inventory listings based on the distance between the search query binary hashing signature and the inventory binary hashing signatures. This distances may be a hamming distance. Those inventory listings with associated hamming distances below a threshold value may be returned as search results. In some cases, a predetermined number of inventory listings associated with the lowest relative hamming distances may be returned as search results. A predetermined number from each relative category or each shard may also be returned as search results. To return search results, the runtime process may include communicating the identified inventory listings, such as communicating them to the client computing device that is associated with the initial search query.

In some embodiments, an aspect may be extracted from a search query to apply an initial filter to inventory listings in relevant categories. This may occur prior to semantic retrieval of inventory listings using the binary hashing signatures. An aspect may be all of or a portion of a search query that describe product properties. For example, some aspects of a search request for "Hello Kitty, Yellow Sunglasses" might be "Hello Kitty," (brand name) "Yellow," (color) and "Sunglasses" (product).

The runtime process of searching for inventory listings within relevant categories may occur in response to a search query that is associated with a low-null search result. A low-null search result is a search result for a search query that returns search results below a threshold value, which may include zero search results, using an initial search method. For example, an initial search method could be a keyword based search. The threshold value may be zero or any positive integer, and may be pre-configured to a particular value. As an example, the threshold value may be about 5, about 10, about 25, about 50, about 100, or about 500 search results. Thus, by way of example, a low-null search result may be defined as a search result for a search query that returns at or between 0 to 25 search results, where the search results may include inventory listings.

The runtime process of searching inventory listings within relevant categories may obviate a low-null search result. For instance, returning a predetermined number of inventory listings having the lowest relevant hamming distances reduces or eliminates the possibility of a low-null search return because inventory listings associated with the shortest hamming distances are returned as search results.

During the runtime process, the retrieved inventory listings may be ranked, such as ranking the listings based on their hamming distance. By way of example, if 10 inventory listings with the shortest relative hamming distances are retrieved from each of 10 relevant categories, then the 100 total inventory listings may be ranked based on the hamming distance between the search query binary hashing signature and each inventory binary hashing signature of the 100 inventory listings. The ranked inventory listings may be communicated back to the client computing device associated with the search query. In addition to, or in lieu of, ranking based on the hamming distance, the ranking may be based on aspect vectors. As an example, two inventory listing—search query pairs may have the same hamming distance, but the pair having a greater number of common aspects, or a lower aspect vector distance, may be ranked higher than the other.

With reference now FIG. 1, an example search system 100 for returning semantically related search results is provided. As illustrated in FIG. 1, the search system 100 comprises computing device 105, data storage 120, offline engine 130, and runtime engine 140, each in communication through network 110 (e.g., a public network or virtual private network "VPN"). Network 110 may include, without limitation, one or more local area networks (LANs) and/or wide area networks (WANs). Computing device 105 may be a client computing device that communicates and receives information, such as search requests and search results. An example computing device suitable for use is described in conjunction with FIG. 8. Data storage 120 may store computer-usable information. An example data storage suitable for use is described as memory 812 in FIG. 8.

Continuing with FIG. 1, as noted, offline engine 130 may perform an offline process that generally creates inventory semantic index 122, stored on data storage 120. Offline engine 130 may utilize semantic-signature generator 150 to generate inventory binary hashing signatures for inventory identifiers of inventory listings. The inventory binary hashing signatures may be stored in inventory semantic index 122 for use by runtime engine 140. Offline engine 130 may train a semantic-signature-generator model, as previously described, for use by the semantic-signature generator 150.

Using the semantic-signature generator 150, the offline engine generates inventory binary hashing signatures from inventory listings.

The semantic signature generator 150 may utilise, as an input, an inventory identifier, such as a title, to generate the inventory binary hashing signature for an inventory listing. In an example, the semantic-signature generator 150 generates the inventory binary hashing signature from a vector representation of the inventory listing. Put another way, the inventory listing may have an associated vector representation of an inventory identifier associated with inventory listing. The semantic-signature-generator model of the semantic-signature generator 150 may generate a binary hashing signature, as a set of 0s and 1s, from the vector representation of the inventory listing. In approximate nearest neighbor search domain, one way to convert a floating point vector representation into a binary hashing signature is to use polysemous codes or product quantization. Using this method, the vector representation in the whole vector space may be partitioned into multi-clusters and use a binary code to denote the cluster id. The quantization may then be done for the float point vectors that fall into each cluster. The binary code of cluster id plus the binary code of the quantization result are used as the converted final binary hashing signatures. In this manner, semantic-signature generator 150 may generate a hashing signature of the vector representation. Thus, the inventory binary hashing signature may be close in distance, such as hamming distance, to a search query binary hashing signature, generated from a vector representation of the search query, when the search query and the inventory listing are semantically related.

Additionally, as previously noted, the semantic-signature-generator model of the semantic-signature generator 150 may be trained to directly generate the binary hashing signature s from an input without a vector representation of the input. For example, a deep learning model may be used to generate binary signatures directly without first generating a float point vector representation. The deep learning model may include a neural network trained on stored behavioral data. The hamming distance between an inventory binary hashing signature and a search query binary hashing signature indicates the semantic relationship between the inventory listing and the search query. As noted, offline engine 130 may generate a plurality of binary hashing signatures for a corpus of stored inventory listings to generate the inventory semantic index 122.

Runtime engine 140 performs a runtime process that generally identifies inventory listings as relevant to a received search query. During the runtime process, a search query may be received from computing device 105. Runtime engine 140, using semantic-signature generator 150, may generate a search query binary hashing signature of the search query. Runtime engine 140 may also employ the use of relevant category recognition service 142 to determine relevant categories for the search query. Relevant categories may be determined from leaf categories. As previously described, relevant category recognition service 142 may generate a vector space representation of the search query and search for relevant categories by comparing the vector space representation of the search query to vector space representations of a category taxonomy that are stored in storage 120 as category index 124.

Having identified relevant categories, runtime engine 140 may identify inventory listings from the relevant categories for the search query. Runtime engine 140 may search the relevant categories and identify semantically related inventory listings by measuring a hamming distance between the search query binary hashing signature and the inventory binary hashing signatures stored in the inventory semantic index 122 within the relevant categories. Runtime engine 140 may employ the use of parallel processing engine 144. Parallel processing engine 144 generally searches the relevant categories and any associated shards in parallel to identify inventory listings from different relevant categories and shards simultaneously.

Based on the hamming distance, runtime engine 140 may identify an inventory listing from a relevant category and communicate the inventory listing to computing device 105 as a search result. When a plurality of inventory listings are identified, such as inventory listings from each relevant category or shard searched, runtime engine 140 may rank the plurality of inventory listings based on the hamming distance. Runtime engine 140 may also rank the plurality of inventory listings based on aspects identified from the search query or an aspect vector distance between an aspect vector associated with the search query and an aspect vector associated with each of the plurality of identified inventory listings. The ranked inventory listings may be communicated to computing device 105 as search results.

Figure 2:
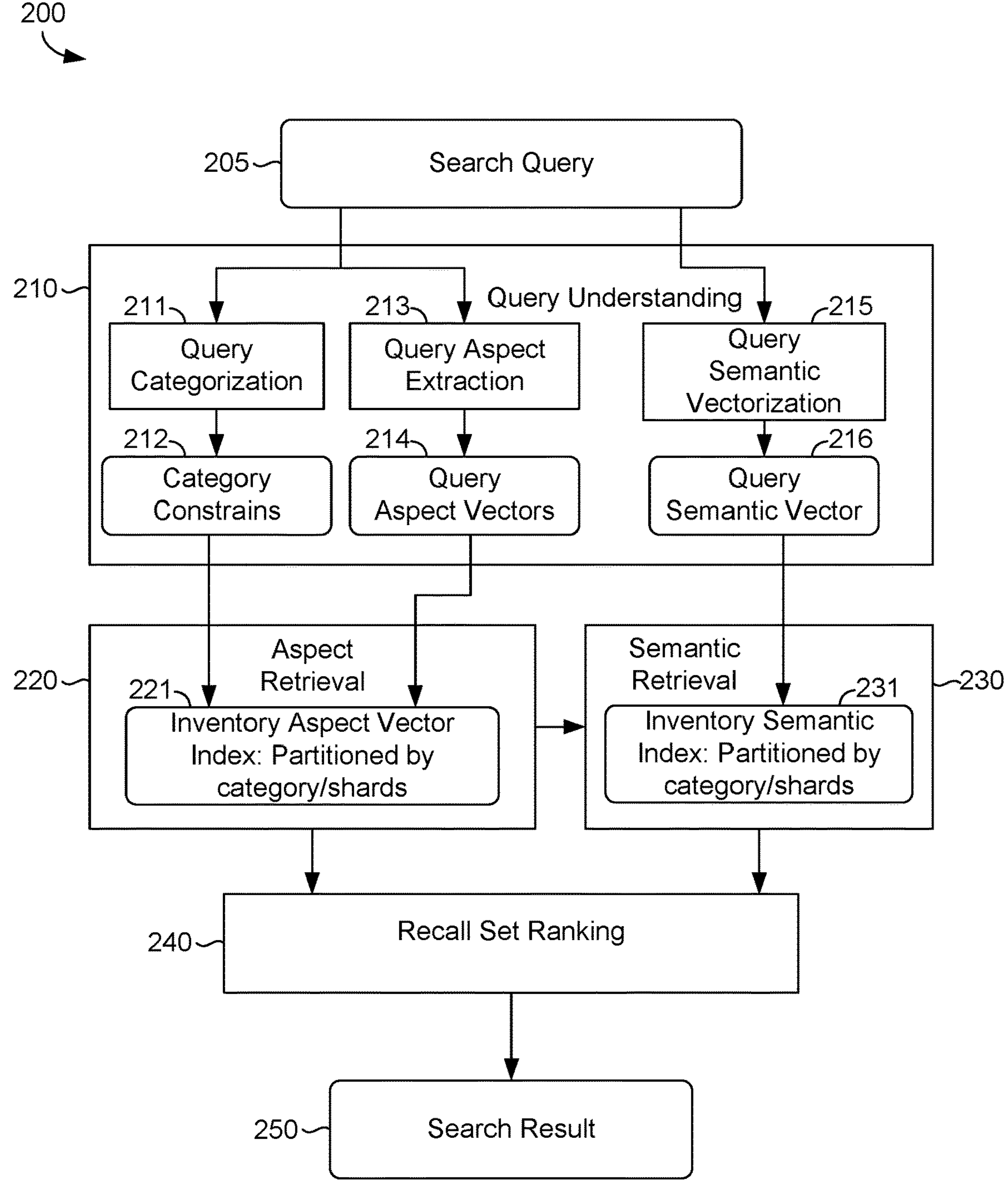
FIG. 2 is a flow chart of an example process for returning search results, in accordance with an embodiment described herein.

Turning now to FIG. 2, an example process of returning semantically meaningful search results is provided. A search query 205 may be received by a runtime engine or during a runtime process. The search query 205 may be received from a client computing device. The search query 205 may represent a request by a user of the client computing device to view search results 250 related to the search query 205. The search query 205 may be associated with an online marketplace for the buying and selling of goods and services.

Query understanding 210 generally represents semantic understanding of search query 205, in terms of relevant categories, aspect vector representations, or binary hashing signatures. One example of query understanding 210 includes query categorization 211, category constraints 212, query aspect extraction 213, query aspect vectors 214, query semantic vectorization 215, and query semantic vector 216. Query understanding 210 is illustrated as having a particular group of elements, such as functions, data, and constrains. However, it will be apparent to one of ordinary skill in the art that query understanding 210 may include more or less elements depending on the embodiment practiced. The individual elements in process 200 are only example s to aid in describing the technology.

The received search query 205 may be evaluated to determine relevant categories, such as at query categorization 211. Query categorization 211 may employ the use of a relevant category recognition service. As previously described, relevant categories may be determined using a machine-learned algorithm, such as neural network, trained using stored behavioral data. Using the search query 205 as an input into the trained model, the relevant categories for the search query 205 are identified. The relevant categories for the search query 205 may be identified and included as category constraints 212. For example, subsequent steps in process 200 may be restricted to searching for inventory listings within the bounds of category constraints 212, which may include only those categories determined to be relevant to the search query 205 by the relevant category recognition service.

Query understanding 210 may include query aspect extraction 213. At query aspect extraction 213, an aspect is extracted from the search query 205. The aspect may be converted to a query aspect vector 214. The aspect vectors 214 may be generated using a machine-learned model, for example a neural network. Two examples of neural networks that may be used are CNN and LSTM neural networks. In some embodiments, the query aspect vectors 214 may be used as an initial filter of inventory listings in relevant categories, further discussed below.

Query understanding 210 may include query semantic vectorization 215. In general, query semantic vectorization 215 generates query semantic vectors 216, i.e., a search query binary hashing signature, from the search query 205. Query semantic vectorization 215 may employ a semantic-signature generator using a semantic-signature-generator model trained from stored behavioral data as previously described.

The category constraints 212 and the query aspect vectors 214 may be used by aspect retrieval 220 to initially filter a plurality of inventory listings in to an initial set of inventory listings. In some cases, aspect retrieval 220 may not be employed at all. When employed, aspect retrieval 220 generally utilizes the query aspect vectors 214 and compares those to inventory aspect vectors stored in an aspect vector index 221, which may also be partitioned by category and shards. In some cases, only the relevant categories of the inventory aspect vector index 221 are searched to determine an initial set of inventory listings based on related aspects between the search query and the inventory listings in the relevant categories. In some cases, the inventory aspect vector index 221 may be created during an offline process.

Semantic retrieval 230 may identify inventory listings from the initial set of inventory listing determined from aspect retrieval 220 as search results. In some cases, semantic retrieval 230 may identify inventory listings directly based on the query semantic vector 216 and an inventory semantic index 231. Put another way, in some embodiments, semantic retrieval 230 may operate independently to identify inventory listings and not as a subsequent process to aspect retrieval 220.

Semantic retrieval 230 generally identifies an inventory listing that is semantically related to the search query 205. In some cases, semantic retrieval 230 identifies a plurality of inventory listings that are semantically related to the search query 205. The semantic retrieval 230 may employ an inventory semantic index 231 to identify the inventory listings. The inventory semantic index 231 may comprise a plurality of inventory binary hashing signatures generated from an inventory identifier associated with an inventory listing that is further associated with a category. One example of an inventory semantic index suitable for use by the present technology is provided in FIG. 4. The inventory semantic index 231 may be partitioned by category and shards, such as that each category and shard is associated with a plurality of inventory listings. The inventory semantic index 231 may have been previously created in an offline process.

Semantic retrieval 230 may identify and retrieve inventory listings by determining a distance, such as a hamming distance, between the search query binary hashing signature and the stored inventory binary hashing signatures. As previously discussed, because the model for generating search query binary hashing signatures and inventory semantic binary hashing signatures may be trained on behavioral data, the shorter the hamming distance, the greater the semantic similarity between the associated search query and the associated inventory listing.

Semantic retrieval 230 may identify inventory listings based on category constraints 212, for example, it may search only the relevant categories. Semantic retrieval 230 may search the relevant categories or shards in parallel, meaning that it may identify inventory listings associated with one relevant category or shard and identify inventory listings associated with another relevant category or shard simultaneously. Semantic retrieval 230 may identify inventory listings that have hamming distances below a threshold value. In addition to or alternatively, semantic retrieval 230 may identify a particular number of inventory listings from each category or shard, similar to methods previously described. For example, semantic retrieval 230 may retrieve inventory listings associated with the top 5 lowest vector distances in each category or shard. Continuing with this example, if there are three relevant categories searched that did not have shards, then the top 5 lowest vector distances for each relevant category are identified, and their associated inventory listings are retrieved, for a total of 15 retrieved inventory listings.

Recall set ranking 240 may rank the retrieved inventory listings received from semantic retrieval 230 so that the most relevant inventory listings are ranked highest. In some embodiments, recall set ranking 240 ranks the retrieved inventory listings based on their hamming distance between the inventory binary hashing signature and the search query binary hashing signature, e.g., the inventory listing associated with the shortest hamming distance is ranked the highest. Recall set ranking 240 may rank the retrieved inventory listings based on an aspect vector or an aspect vector distance between an inventory aspect vector and a query aspect vector. Recall set ranking 240 may rank the retrieved inventory listings based on a combination of the aspect vectors and the hamming distances. Other user behavior scores may also be used in addition to or in lieu of the aspect vector and hamming distances.

The ranked inventory listings may be communicated as search results 250. For example, the ranked inventory listings may be communicated to the client computing device associated with the search query over a network, such as the Internet.

FIG. 2 is not meant to be an exclusive example of returning search results for a search query. Instead, it is meant to illustrate one of many examples of practicing the technology. For instance, in an embodiment, search results are based aspect vectors and hamming distances between binary hashing signatures. In other embodiments, search results are based on the hamming distances only. In another embodiment, both the aspect vectors and the hamming distances are used to determine semantically meaningful search results, however, instead of being a first and second level retrieval process, the process may include identifying a number of inventory listings by comparing aspect vectors and determine a number of inventory listings based on the hamming distances of the binary hashing signatures. The inventory listings identified using both methods may combined and returned as search results.

Figure 3:
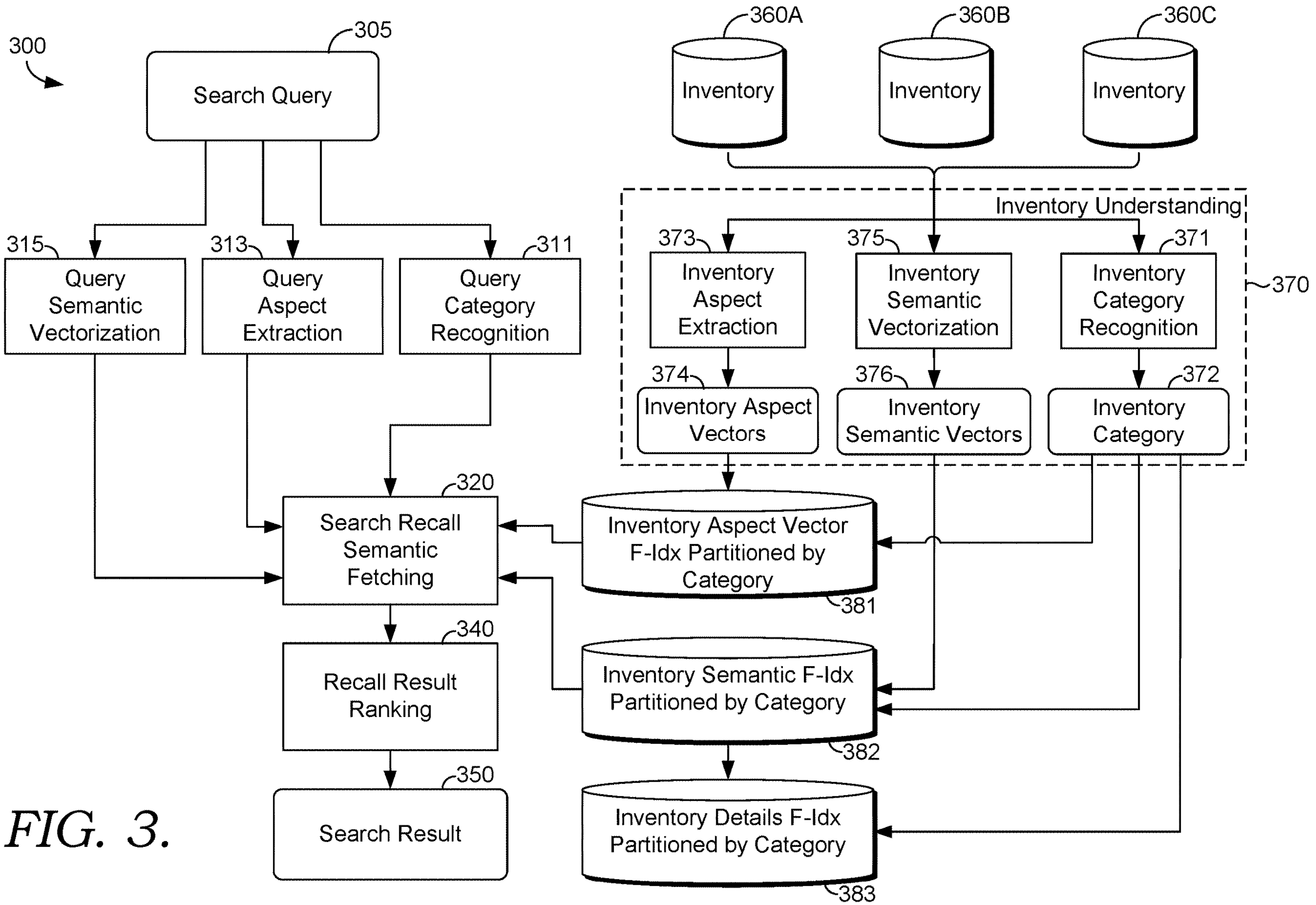
FIG. 3 is a flow chart of an example process for generating an aspect vector index and a semantic vector index, and returning search results using the indices, in accordance with an embodiment described herein.

Turning now to FIG. 3, a process 300 for determining semantically relevant search results is provided. Inventory understanding 370 generally describes and offline process for creating the inventory aspect vector index 381, the inventory semantic index 382, and an inventory details index 383 from inventory listings stored on databases 360A-C. While inventory listings are illustrated as stored on discrete databases 360A-C, there is no restriction that inventory listings be stored on different discrete databases, and rather, in some embodiments, inventory listings may be stored on a single database or in a cloud. Inventory understanding 370 is illustrated as having a particular group of elements, such as functions, data, and constrains. However, it will be apparent to one of ordinary skill in the art that inventory understanding 370 may include more or less elements depending on the embodiment practiced. The elements illustrated in process 300 are only examples to aid in describing the technology.

As noted, inventory listings may be retrieved by inventory understanding 370 from databases 360A-C. Inventory understanding 370 may comprise inventory category recognition 371. Generally, inventory category recognition 371 may associate an inventory listing with an inventory category 372. Inventory category recognition 371 may use a trained machine-learned model to determine from an inventory listing or an inventory identifier, such as title, an inventory category 372 to associate with the inventory listing. Inventory category recognition 371 may associate an inventory listing with an inventory category 372 by comparing a vector representation of the inventory listing to vector representations of a category taxonomy, similar to method described above with respect to the relevant category recognition service. Inventory category recognition 371 may associate a plurality of inventory listing received from databases 360A-C with inventory categories 372. The inventory listings having an associated category may be stored in inventory aspect vector index 381, inventory semantic index 382, and inventory details index 383, so that each of the indices may include a plurality of inventory listings partitioned by category.

Inventory aspect extraction 373 may extract from the received inventory listing an inventory aspect, which in some cases may be extracted from an inventory identifier associated with the inventory listing. Inventory aspect extraction 373 may generate an inventory aspect vector 374 based on the extracted inventory aspect. Inventory aspect extraction 373 may generate inventory aspect vectors 374 for a plurality of inventory listings stored on databases 360A-C. The inventory aspect vectors 374 for the plurality of inventory listings may be stored in inventory aspect vector index 381.

Inventory understanding 370 also comprises inventory semantic vectorization 375. Generally, inventory semantic vectorization 375 generates inventory semantic vectors 376 for the received inventory listings. Inventory semantic vectors 376 may include inventory binary hashing signatures. Inventory semantic vectorization 375 may employ a semantic-signature generator to generate binary hashing signatures for inputs. The inventory binary hashing signatures may be generated from an inventory identifier associated with the received inventory listing stored on databases 360A-C. Inventory semantic vectorization 375 may generate a plurality of inventory binary hashing signatures as inventory semantic vectors 376 for a plurality of inventory listings. The plurality of inventory binary hashing signatures may be stored as in inventory semantic index 382.

Inventory details index 383 may generally comprise other relevant information for retrieving inventory listings during a runtime process. For example, the inventory details index 383 might include an inventory identification number that is associated with a title of an inventory listing. Inventory details index 383 may associate this information in the index so that the inventory listing may be retrieved using an inventory aspect vector or an inventory binary hashing signature. While inventory aspect vector index 381, inventory semantic index 382, and inventory details index 383 are illustrated as stored on discrete databases, nothing restricts the indices from being stored on the same database or in a cloud, and in some cases, the information included in each of the indices may be combined into a single inventory semantic index that is partitioned by categories and shards.

Process 300 further illustrates a runtime process for returning search results 350 for a search query 305 using query category recognition 311, query aspect extraction 313, and query semantic vectorization 315; search recall semantic fetching 320; and recall results ranking 340.

The runtime process may begin by receiving a search query 305, such as from a client computing device. The query category recognition 311 may be may employ a relevant category recognition service to determine at least one relevant category for searching based on the search query 305. Query aspect extraction 313 may extract a search query aspect from the search query and, using a machine-learned model, generate a search query aspect vector of the search query 305. Query semantic vectorization 315 may generate a search query binary hashing signature from the search query 305.

Search recall semantic fetching 320 may identify and retrieve inventory listings using inventory aspect vector index 381, inventory semantic index 382, and inventory details index 383 based on the relevant categories, the search query aspect vector, and the search query binary hashing signature received from query category recognition 311, query aspect recognition 313, and query semantic vectorization 315, respectively. In some cases, search recall semantic fetching 320 may search only those categories of the indices that are determined to be relevant categories.

For example, search recall semantic fetching 320 may compare search query binary hashing signatures received from query semantic vectorization 315 to the inventory semantic binary hashing signatures for relevant categories using inventory semantic index 382. Search recall semantic fetching 320 may identify and recall inventory listings based on a hamming distance determined from the comparison. Search recall semantic fetching 320 may search relevant categories or shards of the inventory semantic index 381 in parallel.

The inventory listings identified as relevant by search recall semantic fetching 320 may be ranked by recall results ranking 340. Generally, the ranking may be based on any combination of aspect vector distances, hamming distances, and any other metric for determining relevancy of the search query to the inventory listings. The ranked set of inventory listings may be communicated to a client device as search results 350 for the search query 305.

FIG. 4 illustrates an example inventory semantic index 400. In this example, the inventory semantic index 400 includes a plurality of inventory identification numbers 410, where each inventory identification number represents an inventory listing. Inventory aspect vector index 400 is also illustrated as having a plurality of inventory titles 320 associated with the inventory identification numbers 410. FIG. 4 is also illustrated as having a plurality of inventory binary hashing signatures 430 that is associated with the plurality of inventory identification numbers 410 and the plurality of inventory titles 420. For example, inventory identification number 412 is associated with inventory title 422, each of which is associated with inventory binary hashing signature 432. In the example provided by FIG. 4, the inventory binary hashing signature 432 is a set of 1s and 0s generated from an inventory identifier, such as title 422. This is only an example, and it is contemplated that other embodiments of inventory semantic index 400 may comprise other types of information, such as index identifiers, and the like.

Figure 5:
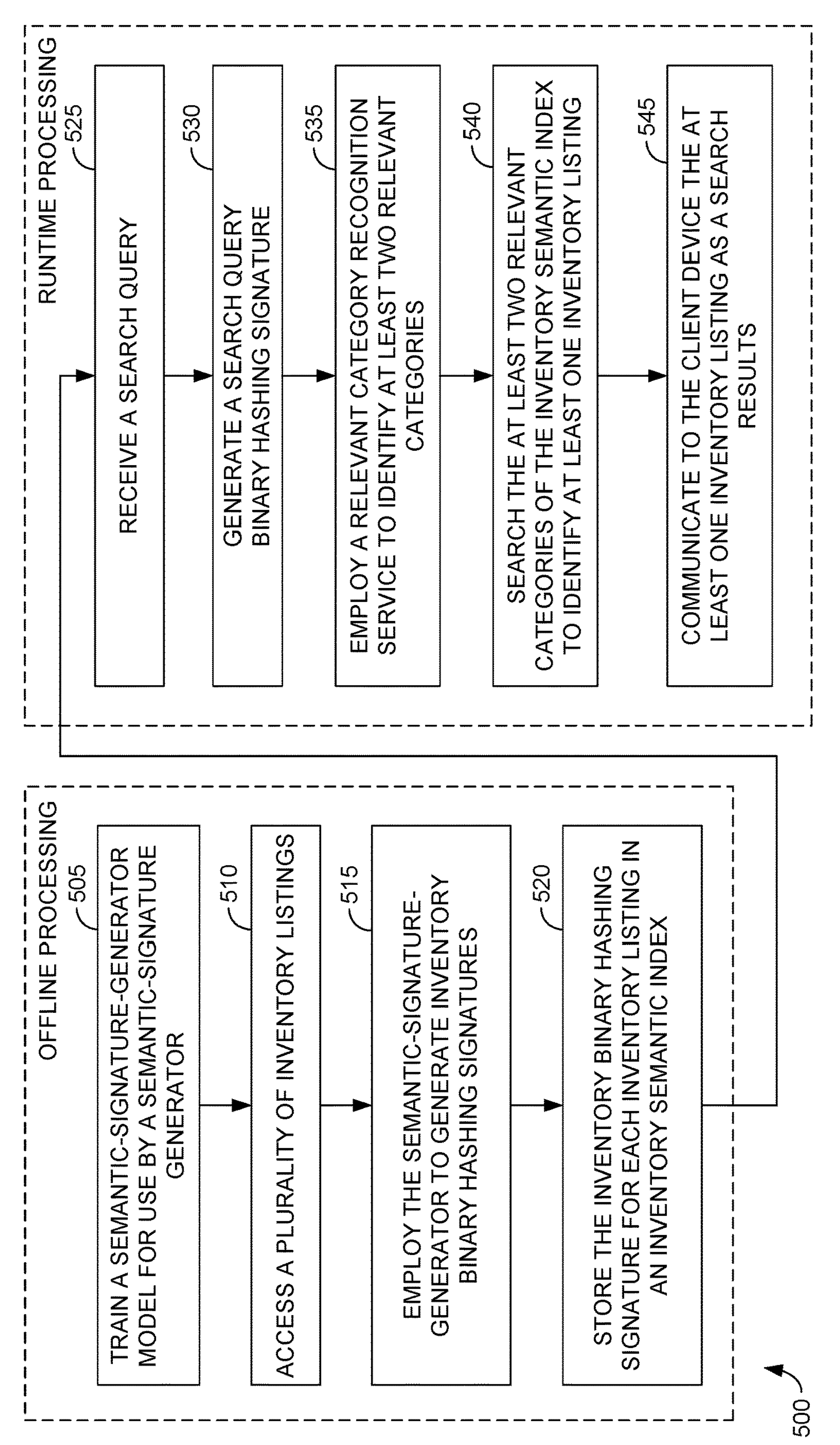
FIG. 5 is an example method of returning search results, in accordance with an embodiment described herein.
Figure 6:
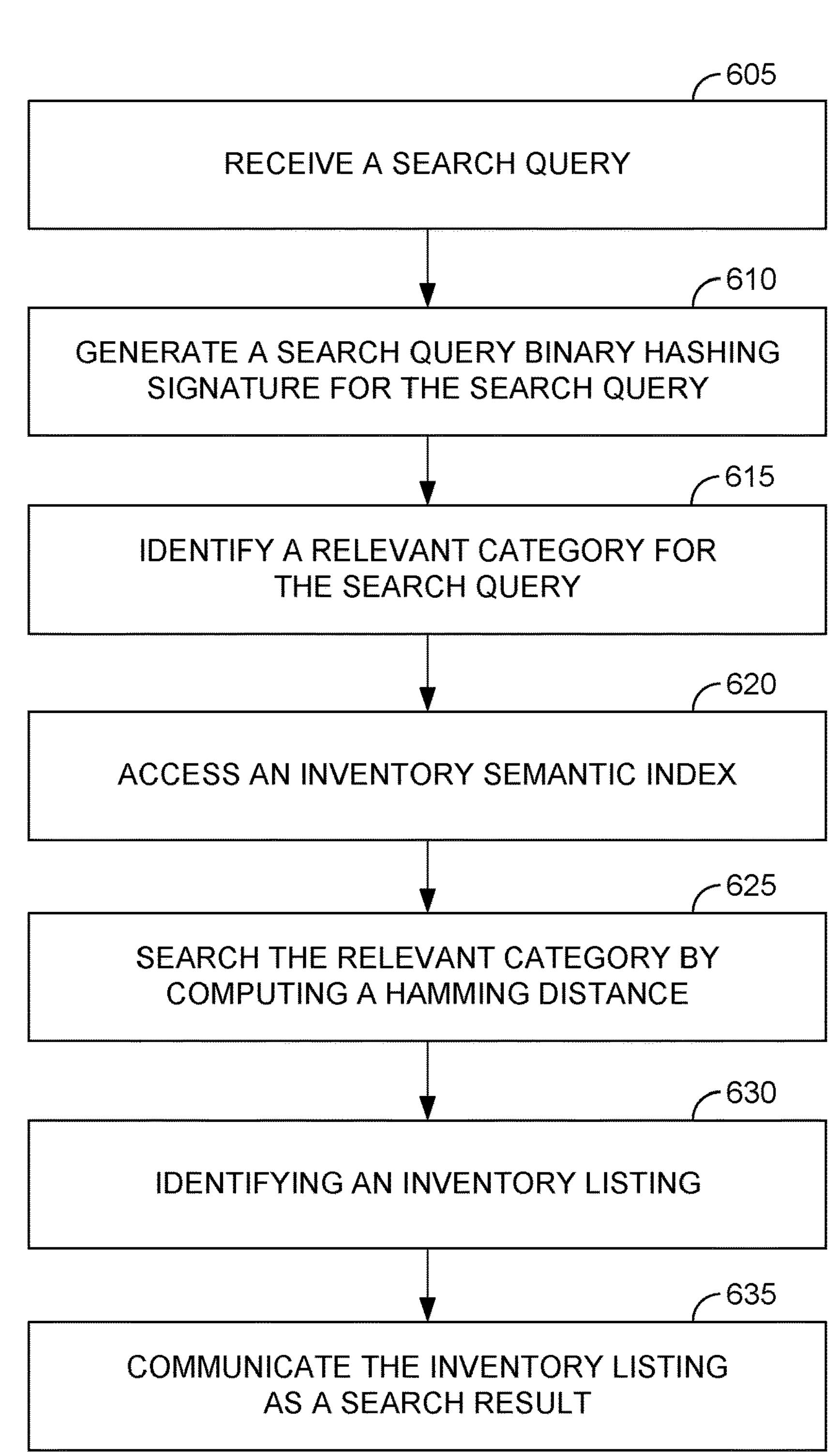
FIG. 6 is another example method of returning search results, in accordance with an embodiment described herein.
Figure 7:
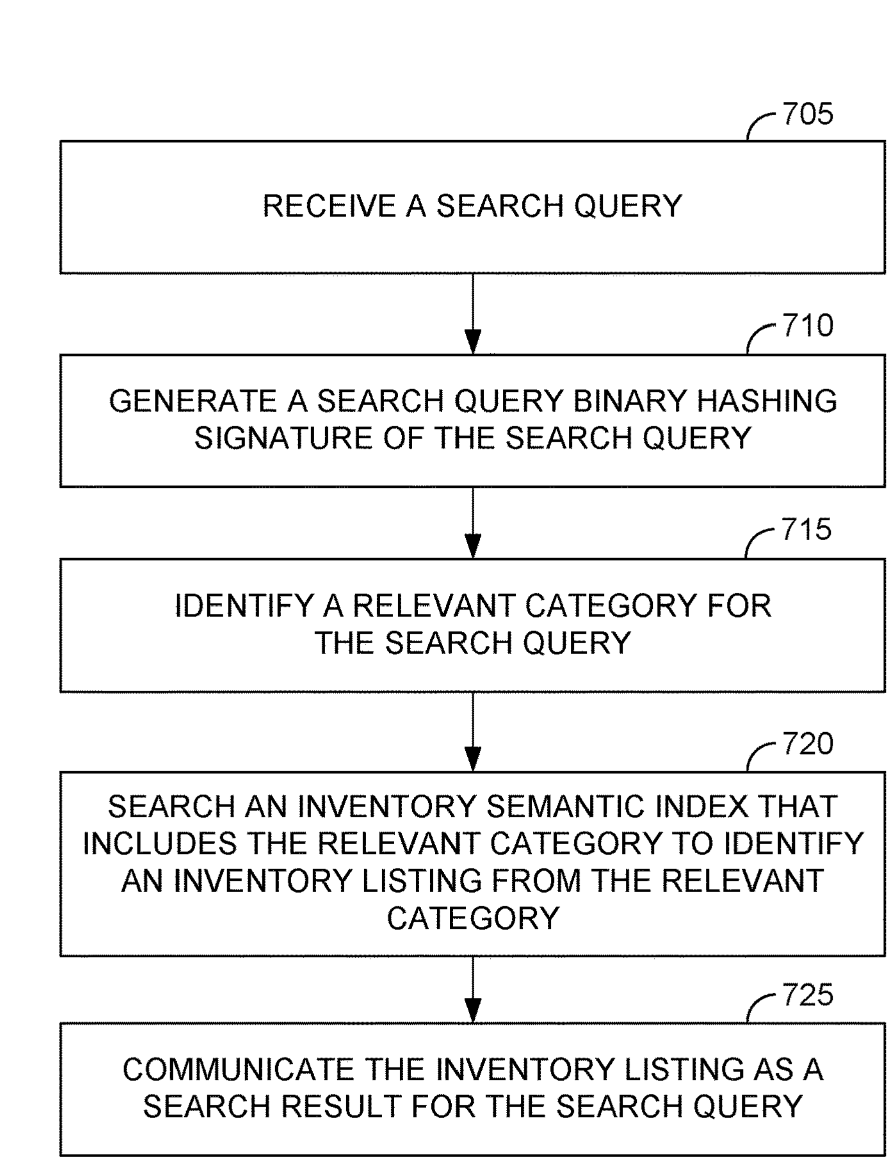
FIG. 7 is another example method of returning search results, in accordance with an embodiment described herein.

With reference to FIGS. 5, 6, and 7, flow diagrams are provided to illustrate methods for processing search queries. The methods may be performed using the search system described herein. In embodiments, one or more computer storage media having computer-executable instructions embodied thereon that, when executed, by one or more processors can cause the one or more processors to perform the methods in the search system.

FIG. 5 provides an example method of returning search results. At block 505 a semantic-signature-generator model is trained. In some cases, the semantic-signature-generator model is trained on stored behavioral data and generates binary hashing signatures for inputs. The semantic-signature-generator model may be trained for use by a semantic-signature generator. At block 510, a plurality of inventory listings is accessed. Each of the plurality of inventory listings may be associated with a category. At block 515, the semantic-signature generator is employed to generate inventory binary hashing signatures based on an inventory identifier associated with each of the plurality of inventory listings. At block 520, the inventory binary hashing signature for each inventory listing is stored in an inventory semantic index. The inventory semantic index may be partitioned by category. In the example provided by FIG. 5, blocks 505, 510, 515, and 520 are each performed as part of an offline computing process.

Continuing with FIG. 5, at bock 525, a search query is received. In some cases, the search query may be received from a client computing device. At block 530, a search query binary hashing signature is generated for the search query using the semantic-signature generator. At block 535, a relevant category recognition service is employed to identify at least two relevant categories for the search query. At block 540, the at least two relevant categories of the inventory semantic index are searched to identify at least one inventory listing. At block 545, the at least one inventory listing may be communicated to the client computing device as a search result for the search query. In the example provided by FIG. 5, blocks 525, 530, 535, 540, and 545 are each performed as part of an online computing process.

With reference now to FIG. 6, another example method of returning search results is provided. At block 605, a search query is received. The search query may be received form a client computing device. At block 610, a search query binary hashing signature for the search query is generated using a semantic-signature generator. At block 615, a relevant category for the search query may be identified. The relevant category may be identified using a relevant category recognition service.

At block 620, an inventory semantic index is accessed. The inventory semantic index may comprise a plurality of inventory listings associated with the relevant category. Each inventory listing may be associated with an inventory binary hashing signature. At block 625, the relevant category may be searched by computing a hamming distance between the search query binary hashing signature and each inventory binary hashing signature for the plurality of inventory listings in the relevant category. At block 630 an inventory listing is identified. The inventory listing may be identified based on the computed hamming distance. At block 325, the inventory listing is communicated as a search result for the search query. In some cases, these may be communicated to a client computing device through a network.

FIG. 7 illustrates another example method of returning search results. At block 705, a search query is received. At block 710, a search query binary hashing signature of the search query is generated. The search query binary hashing signature may be generated using a semantic-signature generator. At block 715, a relevant category for the search query is identified. The relevant category may be identified using a relevant category recognition service.

At block 720, an inventory semantic index that includes the relevant category is searched to identify an inventory listing from the relevant category. The inventory listing is identified based on computing a hamming distance between the search query binary hashing signature and an inventory binary hashing signature of the inventory listing. At block 725, the identified inventory listing is commuted as a search results for the search query.

With brief reference back to FIG. 1 and to search system 100, embodiments described herein support providing search system for processing search queries. The search system components refer to integrated components that implement the search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for form generation, as described herein.

FIG. 1 illustrates an exemplary search system 100 in which implementations of the present disclosure may be employed. In particular, FIG. 1 shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed may be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The search system 100 functionality may be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 8:
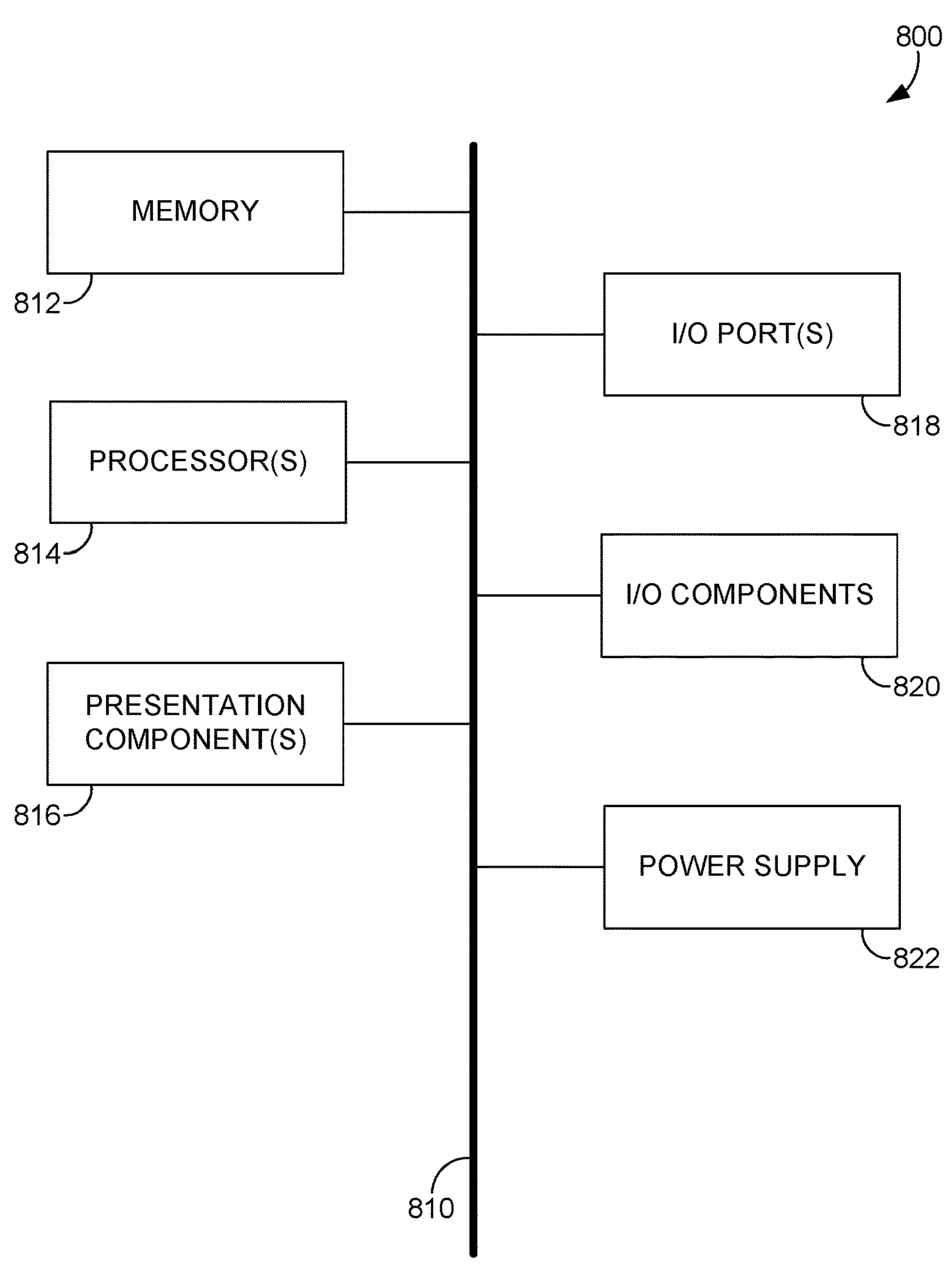
FIG. 8 is an example computing device suitable for embodiments described herein.

Having described an overview of embodiments of the present invention, an exemplary operating environment in which embodiments of the present invention may be implemented is described below in order to provide a general context for various aspects of the present invention. Referring reference now to FIG. 8, an exemplary operating environment for implementing embodiments of the present invention is shown and designated generally as computing device 800. Computing device 800 is but one example of a suitable computing environment and is not intended to suggest any limitation as to the scope of use or functionality. Neither should the computing device 800 be interpreted as having any dependency or requirement relating to any one or combination of components illustrated.

The technology of this disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The described technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that this is the nature of the art, and reiterate that the diagram of FIG. 8 is merely an illustration of a computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory, or other memory technology; CD-ROM; digital versatile disks (DVD) or other optical disk storage; magnetic cassettes, magnetic tape, magnetic disk storage, or other magnetic storage devices; or any other medium that can be used to store the desired information and that can be accessed by computing device 700. Computer storage media excludes signals per se.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media such as acoustic, RF, infrared, and the like. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Example presentation components include a display device, speaker, printing component, vibrating component, etc.

I/O port 818 allows computing device 800 to be logically coupled to other devices including I/O components 820, some of which may be built in. Illustrative components include a microphone, joystick, game pad, satellite dish, scanner, printer, wireless device, etc.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system, the system comprising:

one or more processors; and one or more computer storage media storing computer-useable instructions that, when used by the one or more processors, cause the one or more processors to execute operations comprising:

accessing a plurality of inventory listings, wherein each inventory listing is associated with a category from a plurality of categories;

employing a semantic-signature-generator to generate inventory binary hashing signatures based on an inventory identifier associated with each of the plurality of inventory listings, wherein the semantic-signature-generator is associated with a semantic-signature generator model that is trained to support generating binary hashing signatures; and storing the inventory binary hashing signature for each inventory listing in an inventory semantic index, the inventory semantic index is partitioned by the plurality of categories comprising a first partitioned category having a first index identifier and a second partitioned category having a second index identifier, wherein searching the first partitioned category and the second category comprises employing a parallel processing engine associated with identifying index identifiers, the parallel processing engine utilizes each index identifier to search the first partitioned category and the second partitioned category in parallel, wherein the parallel processing engine is further associated with searching at least two relevant categories in parallel within the inventory semantic index that is partitioned by the plurality of categories by comparing search query binary hashing signatures to inventory binary hashing signatures for each inventory listing in the at least two relevant categories associated with a selected search query, wherein each of the plurality of categories is associated with an index identifier, wherein index identifiers are used to initiate and terminate parallel searches, and wherein the searching by the parallel processing engine continues until the parallel processing engine identifies a boundary defined by a different index identifier for each of the at least two relevant categories searched.

2. The system of claim 1, the operations further receiving a search query;

comprising:

generating a search query binary hashing signature of the search query;

identifying a relevant category for the search query;

accessing the inventory semantic index, wherein the inventory semantic index comprises a plurality of inventory listings associated with the relevant category, each inventory listing associated with an inventory binary hashing signature;

determining that the relevant category corresponds to the first partitioned category;

searching the plurality of inventory listings, within the first partitioned category of the inventory semantic index that corresponds to the relevant category, by computing a hamming distance between the search query binary hashing signature and each inventory binary hashing signature for the plurality of inventory listings in the first partitioned category;

based on computing the hamming distance, identifying an inventory listing based on the hamming distance representing a relative semantic similarity between the search query and the inventory listing; and communicating the inventory listing as a search result for the search query.

3. The system of claim 1, wherein a first relevant category includes at least two index identifiers and a second relevant category includes one index identifier, and the parallel processing engine independently stops searching the first relevant category after processing the at least two index identifiers and stops searching the second relevant category after processing the one index identifier.

4. The system of claim 1, wherein the inventory semantic index is partitioned by leaf categories of the plurality of categories associated with the plurality of listings.

5. The system of claim 2, wherein generating the search query binary hashing signature is performed by the semantic-signature generator, the semantic-signature generator including the semantic-signature-generator model that generates binary hashing signatures from inputs, the semantic-signature-generator model is trained using stored behavioral data so that the binary hashing signatures generated are semantically related based on the stored behavioral data.

6. The system of claim 2, wherein identifying the relevant category includes determining a vector representation of the search query and comparing the vector representation of the search query to a vector representation of the relevant category, wherein the relevant category is identified based on a vector distance determined from the comparison.

7. The system of claim 2, wherein the inventory semantic index includes a plurality of shards that partition the relevant category, and wherein searching the relevant category of the inventory semantic index comprises employing the parallel processing engine to search inventory listings associated with each shard of the plurality of shards in parallel.

8. The system of claim 2, wherein computing the hamming distance comprises determining a number of differences between a set of binary digits representing the search query binary hashing signature and a set of binary digits representing the inventory binary hashing signature.

9. One or more computer storage media having computer-executable instructions embodied thereon that, when executed, by one or more processors, cause the one or more processors to perform a method, the method comprising:

accessing a plurality of inventory listings, wherein each inventory listing is associated with a category from a plurality of categories;

employing a semantic-signature-generator to generate inventory binary hashing signatures based on an inventory identifier associated with each of the plurality of inventory listings, wherein the semantic-signature-generator is associated with a semantic-signature generator model that is trained to support generating binary hashing signatures; and storing the inventory binary hashing signature for each inventory listing in an inventory semantic index, the inventory semantic index is partitioned by the plurality of categories comprising a first partitioned category having a first index identifier and a second partitioned category having a second index identifier, wherein searching the first partitioned category and the second category comprises employing a parallel processing engine associated with identifying index identifiers, the parallel processing engine utilizes each index identifier to search the first partitioned category and the second partitioned category in parallel, wherein the parallel processing engine is further associated with searching at least two relevant categories in parallel within the inventory semantic index that is partitioned by the plurality of categories by comparing search query binary hashing signatures to inventory binary hashing signatures for each inventory listing in the at least two relevant categories associated with a selected search query, wherein each of the plurality of categories is associated with an index identifier, wherein index identifiers are used to initiate and terminate parallel searches, and wherein the searching by the parallel processing engine continues until the parallel processing engine identifies a boundary defined by a different index identifier for each of the at least two relevant categories searched.

10. The media of claim 9, the method further comprising:

receiving a search query;

generating a search query binary hashing signature of the search query;

identifying a relevant category for the search query;

accessing the inventory semantic index, wherein the inventory semantic index comprises a plurality of inventory listings associated with the relevant category, each inventory listing associated with an inventory binary hashing signature;

determining that the relevant category corresponds to the first partitioned category;

searching the plurality of inventory listings, within the first partitioned category of the inventory semantic index that corresponds to the relevant category, by computing a hamming distance between the search query binary hashing signature and each inventory binary hashing signature for the plurality of inventory listings in the first partitioned category;

based on computing the hamming distance, identifying an inventory listing based on the hamming distance representing a relative semantic similarity between the search query and the inventory listing; and communicating the inventory listing as a search result for the search query.

11. The media of claim 10, wherein generating the search query binary hashing signature is performed by the semantic-signature generator, the semantic-signature generator including the semantic-signature-generator model that generates binary hashing signatures from inputs, the semantic-signature-generator model is trained using stored behavioral data so that the binary hashing signatures generated are semantically related based on the stored behavioral data.

12. The media of claim 10, wherein identifying the relevant category includes determining a vector representation of the search query and comparing the vector representation of the search query to a vector representation of the relevant category, wherein the relevant category is identified based on a vector distance determined from the comparison.

13. The media of claim 10, wherein a first relevant category includes at least two index identifiers and a second relevant category includes one index identifier, and the parallel processing engine independently stops searching the first relevant category after processing the at least two index identifiers and stops searching the second relevant category after processing the one index identifier.

14. The media of claim 10, wherein computing the hamming distance comprises determining a number of differences between a set of binary digits representing the search query binary hashing signature and a set of binary digits representing the inventory binary hashing signature.

15. A computer-implemented method for processing search queries, the method comprising:

accessing a plurality of inventory listings, wherein each inventory listing is associated with a category from a plurality of categories;

employing a semantic-signature-generator to generate inventory binary hashing signatures based on an inventory identifier associated with each of the plurality of inventory listings, wherein the semantic-signature-generator is associated with a semantic-signature generator model that is trained to support generating binary hashing signatures; and storing the inventory binary hashing signatures for each inventory listing in an inventory semantic index, the inventory semantic index is partitioned by the plurality of categories comprising a first partitioned category having a first index identifier and a second partitioned category having a second index identifier, wherein searching the first partitioned category and the second category comprises employing a parallel processing engine associated with identifying index identifiers, the parallel processing engine utilizes each index identifier to search the first partitioned category and the second partitioned category in parallel, wherein the parallel processing engine is further associated with searching at least two relevant categories in parallel within the inventory semantic index that is partitioned by the plurality of categories by comparing search query binary hashing signatures to inventory binary hashing signatures for each inventory listing in the at least two relevant categories associated with a selected search query, wherein each of the plurality of categories is associated with an index identifier, wherein index identifiers are used to initiate and terminate parallel searches, and wherein the searching by the parallel processing engine continues until the parallel processing engine identifies a boundary defined by a different index identifier for each of the at least two relevant categories searched.

16. The method of claim 15, the method further comprising:

receiving a search query;

generating a search query binary hashing signature of the search query;

identifying a relevant category for the search query;

accessing the inventory semantic index, wherein the inventory semantic index comprises a plurality of inventory listings associated with the relevant category, each inventory listing associated with an inventory binary hashing signature;

determining that the relevant category corresponds to the first partitioned category;

searching the plurality of inventory listings, within the first partitioned category of the inventory semantic index that corresponds to the relevant category, by computing a hamming distance between the search query binary hashing signature and each inventory binary hashing signature for the plurality of inventory listings in the first partitioned category;

based on computing the hamming distance, identifying an inventory listing based on the hamming distance representing a relative semantic similarity between the search query and the inventory listing; and communicating the inventory listing as a search result for the search query.

17. The method of claim 16, wherein generating the search query binary hashing signature is performed by the semantic-signature generator, the semantic-signature generator including the semantic-signature-generator model that generates binary hashing signatures from inputs, the semantic-signature-generator model is trained using stored behavioral data so that the binary hashing signatures generated are semantically related based on the stored behavioral data.

18. The method of claim 16, wherein identifying the relevant category includes determining a vector representation of the search query and comparing the vector representation of the search query to a vector representation of the relevant category, wherein the relevant category is identified based on a vector distance determined from the comparison.

19. The method of claim 16, wherein a first relevant category includes at least two index identifiers and a second relevant category includes one index identifier, and the parallel processing engine independently stops searching the first relevant category after processing the at least two index identifiers and stops searching the second relevant category after processing the one index identifier.

20. The method of claim 16, wherein computing the hamming distance comprises determining a number of differences between a set of binary digits representing the search query binary hashing signature and a set of binary digits representing the inventory binary hashing signature.

* * * * *